United States Patent [19]

Griffith et al.

[11] 4,316,809

[45] Feb. 23, 1982

[54] MICELLAR FLUID FOR LOW AND HIGH HARDNESS CRUDE OIL DISPLACEMENT

[75] Inventors: Thomas D. Griffith, Tulsa; Daniel S. Denham, Jenks, both of Okla.

[73] Assignee: Standard Oil Company (Indiana), Chicago, Ill.

[21] Appl. No.: 93,359

[22] Filed: Nov. 13, 1979

[51] Int. Cl.$^3$ .............................................. E21B 43/22
[52] U.S. Cl. ................................ 252/8.55 D; 166/275
[58] Field of Search ................... 252/8.55 D; 166/274, 166/275

[56] References Cited

U.S. PATENT DOCUMENTS

| | | | |
|---|---|---|---|
| 3,373,809 | 3/1968 | Cooke | 166/275 X |
| 3,508,612 | 4/1970 | Reisberg et al. | 166/275 X |
| 3,811,507 | 5/1974 | Flournoy et al. | 252/8.55 X |
| 3,827,497 | 8/1974 | Dycus et al. | 166/274 |
| 3,920,073 | 11/1975 | Holm | 252/8.55 X |
| 3,981,361 | 9/1976 | Healy | 252/8.55 X |
| 4,079,785 | 3/1978 | Hessert et al. | 252/8.55 X |
| 4,125,156 | 11/1978 | Glinsmann | 166/252 |

OTHER PUBLICATIONS

Miller et al., Progress Report Prepared for U.S. Depart. of Energy under Contract No. ET-76-C-03-1800 for the Period Ending Mar., 1978.

*Primary Examiner*—Herbert B. Guynn
*Attorney, Agent, or Firm*—Fred E. Hook; William E. Murray

[57] ABSTRACT

A micellar fluid used for displacing crude oil through high and low hardness portions of a subterranean reservoir is formulated with a crude oil displacing hydrocarbon sulfonate surfactant, a water soluble salt of a sulfated, oxyalkylated alcohol and amyl alcohol, preferably n-amyl alcohol.

5 Claims, No Drawings

MICELLAR FLUID FOR LOW AND HIGH HARDNESS CRUDE OIL DISPLACEMENT

SUMMARY OF THE INVENTION

Low salinity, low hardness subterranean reservoirs have been partially hardened by waterflooding with low salinity brines having a higher hardness than the connate water. In a micellar displacement of crude oil through these reservoirs, micellar fluid will be required to displace crude oil while being exposed to both hard and soft water. A suitable micellar fluid for such crude oil displacement is formulated with a crude oil displacing hydrocarbon sulfonate surfactant, a water soluble salt of a sulfated, oxyalkylated alcohol and amyl alcohol, preferably n-amyl alcohol.

DETAILED DESCRIPTION

In the displacement of crude oil through a subterranean reservoir with a micellar fluid, the cations within the reservoir can exchange with cations in the micellar slug. This exchange can affect the performance of a micellar fluid.

The components used in the formulation of micellar fluids are selected for their crude oil displacing efficiency in the presence of the cations in the reservoir. Micellar fluids have been formulated which will efficiently displace crude oil through low salinity, low hardness reservoirs containing less than about 0.05 normal (N) cations and less than about 0.001 N polyvalent cations. Other micellar slugs have been formulated which will efficiently displace crude oil through low salinity, high hardness reservoirs containing less than about 0.05 N cations and greater than about 0.01 N polyvalent cations.

It has now been found that certain crude oil containing subterranean reservoirs have been waterflooded with low salinity, high hardness brines which contain a higher ratio of polyvalent cations to monovalent cations than the connate water. These brines were injected into the reservoir at an injection well and were displaced a portion of the way through the reservoir for displacing crude oil toward a production well. At the termination of the waterflood and the initiation of the micellar fluid, it was found that about the first 25 to 75 volume percent of the pore volume between the injection well and the production well was occupied by the low salinity, high hardness brine used in the waterflood. The remainder of the pore volume was occupied by the low salinity, low hardness connate water. Additionally, the cations on the ion exchange sites of the portion of the reservoir occupied by the low salinity, high hardness waterflood brine were equilibrated with the cations in the waterflood brine.

The micellar fluid of this invention can displace crude oil through both the low salinity, high hardness, and the low salinity, low hardness portion of a reservoir. This is accomplished by formulating the micellar fluid with a crude oil displacing hydrocarbon sulfonate surfactant at a concentration greater than its critical micellar concentration, about 0.5 to 5 and preferably about 1 to about 3 weight percent water soluble salt of sulfated, oxyalkylated alcohol and about 0.5 to about 5 and preferably 1 to 3 weight percent amyl alcohol, preferably n-amyl alcohol.

The crude oil displacing hydrocarbon sulfonate surfactant is commonly prepared by sulfonating hydrocarbons such as crude oil, petroleum fractions or synthetic hydrocarbons. The products resulting from the sulfonation of hydrocarbons are generally neutralized with alkali metal bases or with ammonium hydroxide to produce the sulfonate. Hydrocarbons to be sulfonated are preferably selected such that the average equivalent weight of the sulfonate will be within the range of about 300 to about 600, and preferably within the range of about 400 to about 500. Equivalent weight refers to the molecular weight of the hydrocarbon portion per sulfonate group; e.g., hydrocarbon having an average molecular weight of about 400 and which has been sulfonated with one sulfonate group per hydrocarbon molecule has an average equivalent weight of about 400.

Hydrocarbon sulfonates having equivalent weights below about 400 are generally water soluble, while hydrocarbon sulfonates with equivalent weights above about 400 are generally oil soluble. The oil soluble portion of the sulfonate is an important contributor to the ability of the micellar fluid to displace crude oil, while the water soluble portion of the sulfonate is an important contributor to the ability of the petroleum sulfonate to form a micellar fluid. A mixture of hydrocarbon sulfonates having equivalent weights of about 300 to about 600 have been found to provide micellar fluids over a range of salinity conditions experienced in enhanced oil recovery projects.

The sulfated, oxyalkylated alcohol can be prepared by sulfating an oxyalkylated alcohol having the following general formula:

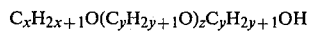

$$C_xH_{2x+1}O(C_yH_{2y+1}O)_zC_yH_{2y+1}OH$$

wherein:
x is a positive integer within the range of 8 to 20 and preferably within the range of 10 to 15,
y is a positive integer within the range of 2 to 6 and preferably within the range of 2 to 3,
z is an integer within the range of 0 to 9 and preferably within the range of 1 to 4.

The water soluble salt of the sulfated, oxyalkylated alcohol can be formed by neutralizing the sulfated alcohol with alkali metal bases, ammonia, ammonium bases, water soluble quaternary ammonium bases, water soluble amines and mixtures thereof.

The resulting water soluble salt of the sulfated, oxyalkylated alcohol has the following general formula:

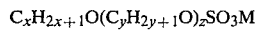

$$C_xH_{2x+1}O(C_yH_{2y+1}O)_zSO_3M$$

wherein:
x is a positive integer within the range of 8 to about 20 and preferably within the range of 10 to 15,
y is a positive integer within the range of 2 to 6 and preferably within the range of 2 to 3,
z is a positive integer within the range of 1 to 10 and preferably within the range of 2 to 5, and
m is an alkali metal, ammonium, or water soluble quaternary ammonium ion, or a water soluble amine or a mixture thereof.

The sodium and ammonium salts of sulfated, ethoxylated alcohols having the following general formula are commercially available from the Shell Chemical Company under the names Neodol 23-3A and Neodol 25-3S and are particularly suited for forming the micellar fluid of this invention:

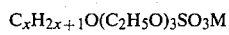

$$C_xH_{2x+1}O(C_2H_5O)_3SO_3M$$

wherein:
x is an integer within the range of about 12 to 15. for Neodol 25-3S and within the range of about 12 to 13 for Neodol 25-3A.
M is sodium for Neodol 25-3S and ammonium for Neodol 23-3A.

The micellar fluid of this invention is illustrated by crude oil displacement tests shown in the following table. These crude oil displacement tests were conducted in Berea sandstone cores which had been treated to simulate the conditions of the reservoir following a waterflood. The hard water used in treating these cores had about 2600 ppm total dissolved solids and about 355 ppm hardness. The soft water used in treating these cores had about 2380 ppm total dissolved solids and substantially no hardness.

The cores containing hard water following the simulated waterflood were treated by flushing crude oil saturated 24 in. (61 cm) long, 2 in. (5 cm) diameter Berea sandstone cores with about 250 volume % of hard water based upon the pore volume of the cores. Cores containing soft water following the simulated waterflood were treated by flushing crude oil saturated 24 in. (61 cm) long, 2 in. (5 cm) diameter Berea sandstone cores with about 100 volume % of 2 N NaCl brine based on the pore volume of the cores followed by about 150 volume % of the soft water based on the pore volume of the cores. The cores containing the combination of hard and soft water were treated by flushing crude oil saturated 48 in. (122 cm) long, 2 in. (5 cm) diameter Berea sandstone cores with about 100 volume % of 2 N NaCl brine based on the pore volume of the cores, followed by about 150 volume % of the soft water based on the pore volume of the cores, followed by about 29 volume % of the hard water based on the pore volume of the cores. This treatment resulted in cores which contained about 40 volume % of hard water based upon the pore volume of the cores and about 60 volume % of soft water based on the pore volume of the cores.

The cores containing the hard water and the combination of hard and soft water were flushed with about 10 volume % of micellar fluid based on the pore volume of the cores, followed by about 120 volume % of a polymer bank based on the pore volume of the cores. The micellar fluids were formulated by homogeneously mixing the surfactant and cosurfactant shown in the table with the hard water. The polymer bank was formulated by homogeneously mixing about 1250 ppm Xanflood brand polysaccharide marketed by the Kelco Company and about 100 ppm Dowcide B brand biocide marketed by the Dow Chemical Company with the hard water.

The cores containing the soft water were flushed with about 10 volume % of the micellar fluid based on the pore volume of the cores followed by about 120 volume % of a polymer bank based on the pore volume of the core. The micellar fluids were formulated by homogeneously mixing the surfactant and cosurfactant shown in the tables with the soft water. The polymer bank was formulated by homogeneously mixing about 1250 ppm Xanflood and about 100 ppm Dowcide B with the soft water.

The crude oil displacement results included in the following table show the improved crude oil displacement under a combination of hard and soft reservoir conditions with a micellar fluid which comprises a hydrocarbon sulfonate surfactant, a water soluble salt of a sulfated oxyalkylated alcohol and n-amyl alcohol.

TABLE

Crude oil displacement from Berea sandstone cores containing crude oil and brine with a micellar fluid comprising about 10 weight percent hydrocarbon sulfonate surfactant and the cosurfactant shown in the table.

| Composition of Brine | Cosurfactant Neodol 25-3S Wt. % | N-Amyl Alcohol Wt. % | Crude Oil Displacement Vol. % |
|---|---|---|---|
| Hard | — | — | 50 |
| Hard | 1.5 | 1.5 | 87 |
| Soft | — | — | 89 |
| Soft | 1.5 | 1.5 | 66 |
| Hard/Soft | — | — | 74 |
| Hard/Soft | 1.5 | 1.5 | 91 |

While certain embodiments of this invention have been described for illustrative purposes, the invention is not limited thereto and various other modifications or embodiments of the invention will be apparent to those skilled in the art in view of this disclosure. Such modifications or embodiments are within the spirit and scope of the disclosure.

What is claimed is:

1. In a method of displacing oil through at least a portion of a crude oil containing subterranean reservoir having an injection means in fluid communication through the reservoir with a production means, wherein an aqueous micellar slug is injected into the reservoir at said injection means and is displaced through at least a portion of said reservoir for displacing crude oil toward said production means, wherein the improvement comprises:
   injecting into a reservoir containing both low hardness water containing less than about 0.001 normal polyvalent cations and high hardness water containing in excess of about 0.01 normal polyvalent cations an aqueous micellar slug consisting essentially of greater than a critical micelle concentration of a crude oil displacing hydrocarbon sulfonate surfactant, about 0.5 to about 5 weight percent of a water soluble salt of a sulfated, oxyalkylated alcohol having the following general formula:

$C_xH_{2x+1}O(C_yH_{2y+1}O)_zSO_3M$ wherein:
x is a positive integer within the range of 8 to about 20,
y is a positive integer within the range of 2 to 6,
z is a positive integer within the range of 1 to 10,
m is an alkali metal, ammonium, or water soluble quaternary ammonium ion, or a water soluble amine or a mixture thereof,
and about 0.5 to about 5 weight percent of amyl alcohol.

2. The method of claim 1 wherein
x is a positive integer within the range of 10 to 15,
y is a positive integer within the range of 2 to 3,
z is a positive integer within the range of 2 to 5.

3. The method of claims 1 or 2 wherein said micellar slug contains about 1 to about 3 weight percent of said sulfated, oxyalkylated alcohol and about 1 to about 3 weight percent of said amyl alcohol.

4. The method of claims 1 or 2 wherein said micellar slug comprises n-amyl alcohol.

5. The method of claim 3 wherein said micellar slug comprises n-amyl alcohol.

* * * * *

UNITED STATES PATENT OFFICE
CERTIFICATE OF CORRECTION

PATENT NO. : 4,316,809

DATED : February 23, 1982

INVENTOR(S) : Thomas D. Griffith and Daniel S. Denham

It is certified that error appears in the above-identified patent and that said Letters Patent are hereby corrected as shown below:

Column 4, lines 1-5, delete "entire text on lines 1-5" (double printing).

Signed and Sealed this

Seventh Day of June 1983

[SEAL]

Attest:

DONALD J. QUIGG

Attesting Officer     Acting Commissioner of Patents and Trademarks